United States Patent [19]

Yui

[11] 4,153,587

[45] May 8, 1979

[54] HIGH INORGANIC FILLER CONTENT COMPOSITION

[75] Inventor: Hiroshi Yui, Yokkaichi, Japan

[73] Assignee: Mitsubishi Petrochemical Co., Ltd., Tokyo, Japan

[21] Appl. No.: 794,612

[22] Filed: May 6, 1977

Related U.S. Application Data

[63] Continuation of Ser. No. 514,131, Oct. 11, 1974, abandoned, which is a continuation-in-part of Ser. No. 430,413, Jan. 3, 1974, abandoned, which is a continuation-in-part of Ser. No. 260,529, Jun. 7, 1972, abandoned.

[51] Int. Cl.$^2$ ............................ C08K 3/00; C08K 9/04
[52] U.S. Cl. ............................ 260/23 H; 260/42.14; 260/42.16; 260/42.24; 260/42.46; 260/878 B
[58] Field of Search .............. 260/42.46, 878 B, 23 H, 260/42.14, 42.16, 42.24

[56] References Cited

PUBLICATIONS

Derwent Publications LTD, NL-7209448, Jan. 9, 1973.

*Primary Examiner*—James H. Derrington
*Attorney, Agent, or Firm*—Oblon, Fisher, Spivak, McClelland & Maier

[57] ABSTRACT

A modified propylene polymer containing mixed polymer composition characterized by high tensile strength, high elongation and good bending stiffness which consists essentially of:
  a. a crystalline polypropylene
  b. a block copolymer wherein a propylene-ethylene random copolymer is chain-terminated onto said crystalline polypropylene
  c. a crystalline ethylene-propylene random copolymer having an ethylene content of more than about 90% by weight, the improvement which comprises admixing with said modified propylene polymer at least 30% by weight of an inorganic filler having an average particle size of less than 20μ in diameter.

8 Claims, No Drawings

HIGH INORGANIC FILLER CONTENT COMPOSITION

CROSS-REFERENCE TO RELATED APPLICATIONS

This is a continuation of application Ser. No. 514,131, filed Oct. 11, 1974 now abandoned, which is a continuation-in-part application of Ser. No. 430,413, filed Jan. 3, 1974 now abandoned, which is a continuation-in-part of application Ser. No. 260,529, filed June 7, 1972 now abandoned.

BACKGROUND OF THE INVENTION

1. Field of the Invention

This invention relates to a polyolefinic composition containing a high content of inorganic filler, which is characterized by high impact strength, and relatively low heat of combustion, which allows ready burning of the composition. The composition of this invention is useful for such applications as corrugated cardboard, synthetic paper and synthetic wood.

2. Description of the Prior Art

Heretofore, the polyolefins, particularly polyethylene and polypropylene, have found a variety of uses as packaging materials, and as building and interior materials. Because polyolefins have excellent characteristics, processability, and are low in cost, their use in many areas has rapidly increased. However, the increased use of polyolefinic products has increased the pollution problem associated with the disposal of polyolefinic wastes. When polyolefinic materials are burned, they do not burn completely into gaseous products as do the cellulosic materials. Instead, they melt, forming an ill-defined mass of dense plastic. In addition, the high heat of combustion of polyolefinic materials requires a high furnace temperature which frequently results in rupture of the furnace walls. Furthermore, a large amount of soot is produced in the combustion process. Because of the difficulties associated with the combustion of polyolefinic materials, disposal of these materials is troublesome. Thus, the production of polyolefinic products has been limited because of the problems associated with their disposal.

In order to overcome these difficulties, the addition of an incombustible inorganic filler to the polyolefinic matrix has been proposed. However, because the affinity of the inorganic filler to the polyolefinic matrix is relatively weak, a high content of filler will cause the polyolefinic material to become brittle. Moreover, a high content of inorganic filler will not be as readily miscible in the polyolefinic matrix, and hence tends to decrease elongation and impact strength characteristics. Consequently, it is difficult to obtain an adequate polyolefinic composition having a filler content of greater than 50 weight percent.

It is well known in the art that the presence of a filler in a polyolefinic matrix results in increased bending stiffness of polyolefinic products. However, because of the loss in tensile elongation and impact strength, these compositions are unsuitable for use as corrugated cardboard and synthetic wood. Since it is theorized that these deficiencies are caused by the poor affinity of the filler to the polyolefinic matrix, it has been proposed to attempt to increase the affinity of fillers for polyolefinic materials by surface treating the filler to provide an oleophilic surface. However, it has been found that when conventional polyolefins, such as polypropylene and polyethylene are used, it is difficult to increase the affinity of fillers for the polyolefinic materials, even though the surface of the fillers have been treated with an oleophilic material. Accordingly, polyolefin-inorganic filler compositions having excellent bending stiffness, tensile elongation, impact strength and good balanced characteristics, have heretofore not been obtainable.

In U.S. Pat. No. 3,629,368, the assignee had disclosed a novel modified propylene polymer which is characterized by improved impact resistance and toughness at low temperatures as well as having a high softening point and stiffness. In one embodiment, that polymer was produced by polymerizing a propylene and subsequently continuously polymerizing ethylene after purging the polymerization system of propylene down to a pressure of less than 1.5 atmospheres. The polymerization is carried out at a temperature of 30°–100° C. and a pressure of 1–10 atmospheres utilizing a dialkylaluminum monohalide and titanium trichloride catalyst system. The ethylene is thus polymerized in the presence of a homopolymer of propylene, and 5 to 25% by volume of propylene in the vapor phase. The amounts of the ethylene and propylene fed to the reaction system are adjusted so that the resulting modified propylene polymer will contain from 5 to 40% by weight of ethylene, the overall polymerization reaction being conducted such that at least 300 parts by weight of polymer is formed per one part by weight of the titanium tetrachloride. The resulting modified propylene polymer is reported to be a. a crystalline polypropylene
b. a block copolymer wherein a propylene-ethylene random copolymer is end terminated onto the crystalline polypropylene
c. a crystalline ethylene-propylene random copolymer having an ethylene content of more than about 90% by weight.

However, it was not recognized that the incorporation of a filler into this polymer would result in any effect which is different than the effects obtained by incorporating a filler into more conventional polyolefin compositions.

SUMMARY OF THE INVENTION

Accordingly, it is one object of this invention to provide a high inorganic filler content polyolefinic composition characterized by high tensile elongation, high impact strength, good bending stiffness and well-balanced characteristics.

It is another object of this invention to provide a high inorganic filler content polyolefinic composition, characterized by high tensile strength, high elongation, and good impact strength and good bending stiffness, without having a high heat of combustion and which can be burned without emitting a corrosive or poisonous gas.

These and other objects of this invention, as will hereafter become more readily apparent, have been attained by a modified propylene polymer containing a mixed polymer composition characterized by high tensile strength, high elongation and good bending stiffness which consists essentially of a. a crystalline polypropylene
b. a block copolymer wherein a propylene-ethylene random copolymer is chain-terminated onto said crystalline polypropylene c. a crystalline ethylene-propylene random copolymer having an ethylene content of more than about 90% by weight, the improvement which comprises admixing with said modified propylene polymer at least 30% by weight of an inorganic filler having an average particle size of less than 20μ in diameter.

DETAILED DESCRIPTION OF THE PREFERRED EMBODIMENTS

The applicants had reported in U.S. Pat. No. 3,629,368 the preparation of the polymer mixture used in the present invention to be as follows:

First, propylene is fed to the reaction system, and then the polymerization of the propylene is carried out at a temperature of 30°–100° C. and a pressure of 1–10 atmospheres, in the presence of titanium trichloride and dialkylaluminum monohalide, following which the polymerization of ethylene is carried out in the same reaction system under the same conditions. The polymerization of the ethylene is carried out in the presence of propylene averaging 5–25% by volume during the time the ethylene is being polymerized. This is, before the ethylene is introduced, the unreacted propylene is purged from the system to less than 1.5 atmospheres.

In the foregoing process, the two catalyst components are suspended in an autoclave in an inert aliphatic alicyclic or aromatic hydrocarbon or a mixture thereof, and the polymerization of the propylene is carried out at a temperature of 30°–100° C., and preferably 40°–80° C., and a pressure of 1–10 atmospheres. If desired, a suitable amount of hydrogen may be incorporated in the polymerization system at this time to lower the degree of polymerization of the resulting polypropylene. Preferably, the polymerization of propylene is continued in this case until the formation of the crystalline polypropylene amounts to 300–700 parts per each part by weight of the titanium trichloride. The polymerization of ethylene is then carried out in the same reaction system as hereinabove described at a temperature and pressure range identical to that used in polymerizing the propylene. In the case of the polymerization of ethylene, the content in the autoclave of the ethylene and propylene are made to be (as average values from the start of the polymerization of the ethylene to its completion) 75–95% by volume of the former to 25–5% by volume of the latter. Thus, the polymerization of ethylene is carried out in the presence of not more than 25% by volume of propylene (as an average value during the total polymerization of the ethylene). The polymerization of ethylene is thus continued until the content of ethylene in the whole polymer becomes 3–30% by weight.

The polymeric slurry formed upon completion of the polymerization reaction can be purified and a solid polymer obtained therefrom by the same method as in the case of the conventional crystalline polypropylene slurry.

A good catalyst to be used in the polymerization reaction of the present invention is the combination of titanium trichloride and dialkylaluminum monohalide.

The term "titanium trichloride" as used, is intended to encompass not only that obtained by reducing titanium tetrachloride with hydrogen but also that obtained by reducing titanium tetrachloride with metallic aluminum or alkyl aluminum or that obtained by treating these with a suitable means such as heat treatment and/or comminution.

The polymeric composition used in this invention and prepared in this manner has an ethylene content of 3–30% and consists essentially of a. 95–60 wt % of a crystalline propylene homopolymer, b. 1–20 wt % of a crystalline block copolymer having the structure polypropylene-(ethylene-propylene) random copolymer, and c. 3–35 wt % of a crystalline random ethylene-propylene copolymer having an ethylene content of more than 90 wt %. In accordance with this invention, the above-described polymeric composition has admixed therein at least 30 wt % of an inorganic filler of a particle size of less than 20μ diameter.

Further description of the polymeric composition and methods of producing the same are described in U.S. Pat. No. 3,629,368.

When this type of copolymer mixture is combined with an inorganic filler, especially a modified organic filler having an oleophilic surface, a composition results which has excellently balanced characteristics through the synergistic effects between the modified filler and the ethylene-propylene copolymer mixture.

In the preparation of the filled ethylene-propylene copolymer mixture of the invention, any of the conventional inorganic fillers may be used herein, such as metal oxides, hydroxides, carbonates, silicates, silicate type minerals or the like. The inorganic filler content in the composition will range from 30–90 wt % and preferably to more than 50 wt %.

Very good results have been attained when the inorganic filler used has been treated to render its surfaces oleophilic or liphophilic. However, this is not mandatory for all applications. Suitable inorganic fillers used in the compositions of this invention include calcium sulfate, titanium oxide, aluminum oxide, ferric oxide, aluminum hydroxide, calcium carbonate, barium sulfate, calcium sulfite, calcium silicate, magnesium silicate, talc, mica, zeolite, kaoline, asbestos, and silica (including the various hydrates thereof). The particle size of the fillers should be less than 20μ in diameter, preferably 1–5 microns in diameter. Mixtures of said inorganic fillers may also be used. If the surface of the inorganic filler is hydrophilic, the filler usually coagulates in the propylene-ethylene copolymer mixture producing continuous structure of filler particles in mutual contact. The resulting filler-polyolefinic composition is weakened and easily broken. Accordingly, the inorganic filler particles should be provided with an oleophilic surface to avoid the problem of coagulation. In order to provide a suitable oleophilic surface, the block propylene-ethylene copolymer mixture and the inorganic filler are admixed with a surface-active agent having an oleophilic group, such as a polymerizable monomer or oligomer which forms an oleophilic group by heating, or a higher fatty acid and its salts. When absorbed onto the surface of the particles, the oleophilic filler additive is oriented by attractive molecular forces or is actually chemically bound to the filler to form an oleophilic surface. When an inorganic filler having a modified oleophilic surface is used, synergistic effects have been found to occur between the filler and the propylene-ethylene copolymer mixture to provide a composition having balanced high tensile strength, good elongation and good impact strength characteristics.

It is preferable to use a modified inorganic filler prepared by admixing a free-radical or ionic polymerizable monomer with an inorganic filler, and then crushing the filler to expose a greater surface area of the filler to the monomer. Alternatively, after the inorganic filler has been initially exposed to the monomer, the treated filler is separated from the monomer, crushed to expose a fresh surface and then resubjected to the monomer to form a more extensively modified surface area. Specifically, it is possible to use a modified inorganic filler prepared by admixing a vinyl type polymer with an inorganic filler, and then crushing the filler to form a fresh surface to be subjected to the vinyl type polymer. Suitable polymerizable monomers which can be used for this purpose include the various free radical or ionic polymerizable monomers, such as acrylic acid, acrylate, methacrylic acid, methacrylate, styrene, acrylonitrile, acrylamide; vinyl monomers, e.g., vinylchloride; α-olefins, e.g., ethylene, propylene, butene-1; dienes e.g., butadiene isoprene; and epoxy compounds, e.g., ethyleneoxide, propyleneoxide. Most preferred are the fillers modified with methyl methacrylate. It is also possible to admix a fatty acid or other surface active agents with the fillers instead of the aforementioned monomers.

The block propylene-ethylene copolymer mixture of the invention can hold a high content of inorganic filler. The maximum content of inorganic filler which is held by the polyolefinic copolymer, can be remarkably increased by using a modified inorganic filler. Blending of the block propylene-ethylene copolymer mixture and the inorganic filler can be performed by conventional kneading techniques such as the use of a roller, a Bambury mixer, or a double axis extruder. The resulting composition will have a low heat of combustion, and will not generate soot, a corrosive gas or a poisonous gas, when burned. Therefore, the composition can be burned, even in a conventional furnace, without difficulty.

When the block propylene-ethylene copolymer mixture of the invention is used, it is possible to minimize the decrease in tensile elongation and impact strength, even though the content of the inorganic filler is increased to amounts greater than 50 weight percent of the composition. The remarkable effects of balanced high tensile elongation, bending stiffness and impact strength attained in the high inorganic filler content compositions cannot be realized in compositions using polyolefinic homopolymers. For example, the impact strength of high density polyethylene is greater than that of the propylene-ethylene copolymer mixture. However, when the copolymer mixture is combined with amounts of greater than 50 weight percent filler, the impact strength of the resulting propylene-ethylene copolymer will be greater than that of the high density polyethylene composition. In general, the characteristics of the filler-resin compositions greatly depend upon not only the affinity of the filler and the resin, but also the resin itself.

In the preparation of the filler special copolymer, less than 70 wt % of the copolymer mixture is melted and uniformly admixed with more than 30 wt % preferably more than 50 wt % of an inorganic filler of a particle size less than 20μ and which has oleophilic surfaces.

Various conventional antioxidants, neutralizers, ultraviolet absorbers, anti-static agents, or the like, may be incorporated into the composition.

The ethylene-propylene block copolymer mixture as described above has been blended with various conventional block and random copolymers with the surprising result that essentially no poisonous gases are evolved during combustion.

Having now generally described the invention, a further understanding can be attained by reference to certain specific Examples which are provided herein for purposes of illustration only and are not intended to be limiting in any manner, unless otherwise specified.

EXAMPLE 1

Block propylene-ethylene copolymer mixture of the invention

A 1.2 g quantity of a fine powder of titanium trichloride, 2.4 g of diethyl aluminum monochloride, 1.5 l. of n-heptane and 900 cc of hydrogen gas were fed into a 3 l. autoclave fitted with a stirrer. Propylene was continuously supplied to the autoclave at 60° C. under 6 atm. pressure for 2.5 hours to polymerize the propylene. The system was purged of unreacted propylene until a pressure of propylene remained equivalent to 18 weight percent propylene. Ethylene was supplied to the autoclave at 60° C. under 3 atm. pressure to polymerize ethylene and propylene until it provides a copolymer containing about 12 weight percent ethylene. The resulting polymer slurry was admixed with butanol to decompose the catalyst. The mixture was centrifugally separated, washed with water, and dried to give the polymer.

An analysis of the polymer shows that the copolymer consists of:
(1) a crystalline propylene homopolymer having a molecular weight of 3,000,000,—82 wt %;
(2) a crystalline block copolymer of a molecular weight of 2,000,000 having random ethylene-propylene copolymer units connected to the edge of the polypropylene chain,—8 wt %; and
(3) a crystalline random ethylene-propylene copolymer of a molecular weight of 1,500,000,—10 wt %.

REFERENCE 1

Conventional Block Propylene-Ethylene Copolymer

A conventional block propylene-ethylene copolymer, which was used as reference system, was prepared by polymerizing propylene in the same catalyst system. As the system was purged of unreacted propylene, ethylene was continuously supplied to the autoclave to give a copolymer containing 12 weight percent ethylene. The polymer was purified by the conventional method yielding a conventional block propylene-ethylene copolymer. The copolymer has no random ethylene-propylene connected to the edges of the polypropylene (Reference).

Both the conventional and new copolymers were admixed with calcium carbonate modified with a fatty acid, or kaoline clay having a liphophilic surface and were kneaded with a roller mill to form a sheet. The results of the measurements of the bending modulus of elasticity, elongation and impact strength of the sheets are shown in Table 1.

TABLE 1

| Resin | Filler | Ratio of resin to filler | Bending modulus of elasticity (kg/cm²) | Elongation (%) | Impact Strength Dynstat (kgam/cm²) |
|---|---|---|---|---|---|
| Novel block propylene-ethylene copolymer mixture (1) | Calcium carbonate (1.7 micron average diameter) | 70 : 30 | 19,100 | 410 | 30< |
|  |  | 50 : 50 | 23,400 | 150 | 10.2 |
|  |  | 30 : 70 | 45,400 | 34 | 4.6 |
| Conventional block propylene-ethylene copolymer (2) | " | 70 : 30 | 19,200 | 250 | 22 |
|  |  | 50 : 50 | 29,000 | 83 | 7.6 |
|  |  | 30 : 70 | 45,800 | 5 | 2.8 |
| Novel block copolymer mixture (1) | kaoline clay (3 micron average diameter) | 70 : 30 | 18,000 | 370 | 30< |
|  |  | 50 : 50 | 27,300 | 135 | 8.9 |
|  |  | 30 : 70 | 44,500 | 13 | 3.5 |
| Conventional block copolymer (2) | " | 70 : 30 | 18,500 | 214 | 18 |
|  |  | 50 : 50 | 27,800 | 60 | 5.8 |
|  |  | 30 : 70 | 44,800 | 3 | 2.4 |

EXAMPLE 2

1.2 g of fine titanium trichloride, 2.4 g of diethyl aluminum monochloride, and 1.5 liter of n-heptane were charged into a 3 liter autoclave equipped with a stirrer, and 0.9 liter hydrogen gas was charged, and then propylene was continuously supplied to the autoclave at 60° C. under a pressure of 6 atm. for 2.5 hours to polymerize propylene. A part of an unreacted propylene was purged so as to remain 18% by weight of propylene to total propylene and polypropylene. Ethylene was supplied to the autoclave at 60° C. under 3 atm., so as to copolymerize ethylene and propylene on polypropylene until a specific block copolymer mixture had about 15% by weight of ethylene component.

The resulting polymer slurry was admixed with butanol to decompose the catalyst. The mixture was centrifugally separated, was washed with water, and dried to form to the specific block copolymer mixture. The similar process was repeated to compolymerize ethylene and propylene on polypropylene until the specific block copolymer mixture had about 10% by weight or 18% by weight of ethylene component.

According to the analysis of the specific block copolymer mixture, the following components were found in the mixture.

(E: ethylene content)

|  | Total ethylene content | E = 10 wt. % | E = 15 wt. % | E = 18 wt. % |
|---|---|---|---|---|
| a | homopolymer of propylene | 80% | 70% | 64% |
| b | block copolymer (propylene-ethylene random copolymer is blocked to polypropylene) | 10% (E = 1%) | 15% (E = 1.5%) | 18% (E = 1.8%) |
| c | ethylene-propylene random copolymer | 10% (E = 9%) | 15% (E = 13.5%) | 18% (E = 16.2%) |

The specific block copolymer mixture prepared by the process is referred as Special Block Copolymer (E=10, 15 or 18 wt. %).

REFERENCE 2

Preparation of conventional block copolymer (Aishima) (U.S. Pat. No. 3,694,403)

The same catalyst system and hydrogen gas were charged in accordance with the above preparation (1), and then propylene was continuously supplied, to the autoclave in the same condition. All of unreacted propylene was purged with no remaining gas. Ethylene was supplied to the autoclave at 60° C. under 3 atm., so as to polymerize ethylene on polypropylene until a block copolymer had about 15% by weight of ethylene content.

The resulting polymer was purified in accordance with the above preparation (1).

The similar process was repeated to copolymerize ethylene and propylene on polypropylene until the block copolymer had about 10% by weight or 18% by weight of ethylene content. The conventional block copolymer prepared by the process is referred as Conventional Block Copolymer (E=10, 15 or 18 wt. %).

(3) COMPARATIVE TESTS

The unmodified calcium carbonate having average diameter of 1.7μ was admixed with the specific block copolymer or the conventional block copolymer at a ratio of resin to filler of 100:0, 70:30, 50:50 or 30:70, and the mixture was kneaded with a roller kneader to form a sheet.

The results of the bending modulus, the elongation and the impact strength of the sheets are shown in the following Tables 1, 2 and 3.

TABLE 1

| Resin | Ratio of resin to filler | Bending modulus of elasticity (kg/cm²) | Elongation (%) | Impact strength dynstat (kg cm/cm²) | |
|---|---|---|---|---|---|
|  |  |  |  | at 20° C. no loading | at −20° C. 20 kg-cm loading |
| Specific Block Copolymer (E = 15 wt. %) | 100:0 | 10,200 | 580 | 50< | 25 |

TABLE 1-continued

| Resin | Ratio of resin to filler | Bending modulus of elasticity (kg/cm²) | Elongation (%) | Impact strength dynstat (kg cm/cm²) | |
|---|---|---|---|---|---|
| | | | | at 20° C. no loading | at −20° C. 20 kg-cm loading |
| Conventional Block Copolymer (E = 15 wt. %) | " | 10,200 | 600 | 50< | 24 |
| Specific Block Copolymer (E = 15 wt. %) | 70:30 | 19,500 | 360 | 28 | 8.5 |
| Conventional Block Copolymer (E = 15 wt. %) | " | 19,600 | 190 | 18 | 5.7 |
| Specific Block Copolymer (E = 15 wt. %) | 50:50 | 29,200 | 125 | 9.2 | 3.3 |
| Conventional Block Copolymer (E = 15 wt. %) | " | 28,300 | 65 | 6.4 | 2.1 |
| Specific Block Copolymer (E = 15 wt. %) | 30:70 | 45,000 | 28 | 3.8 | 1.8 |
| Conventional Block Copolymer (E = 15 wt. %) | " | 45,900 | 3 | 2.5 | 1.0 |

TABLE 2

| Resin | Ratio of resin to filler | Bending modulus of elasticity (kg/cm²) | Elongation (%) | Impact strength dynstat (kg cm/cm²) | |
|---|---|---|---|---|---|
| | | | | at 20° C. No loading | at −20° C. 20 kg-cm loading |
| Specific Block Copolymer (E = 10 wt. %) | 100 : 0 | 10,800 | 580 | 50< | 22 |
| Conventional Block Copolymer (E = 10 wt. %) | " | 11,000 | 600 | 50< | 20 |
| Specific Block Copolymer (E = 10 wt. %) | 70 : 30 | 20,300 | 350 | 26 | 7.9 |
| Conventional Block Copolymer (E = 10 wt. %) | " | 20,400 | 180 | 16 | 5.1 |
| Specific Block Copolymer (E = 10 wt. %) | 50:50 | 30,400 | 120 | 8.5 | 3.0 |
| Conventional Block Copolymer (E = 10 wt. %) | " | 30,800 | 58 | 5.7 | 1.8 |
| Specific Block Copolymer (E = 10 wt. %) | 30 : 70 | 45,900 | 25 | 3.4 | 1.7 |
| Conventional Block Copolymer (E = 10 wt. %) | " | 46,500 | 3 | 2.0 | 0.9 |

TABLE 3

| Resin | Ratio of resin to filler | Bending modulus of elasticity (kg/cm²) | Elongation (%) | Impact strength dynstat (kg cm/cm²) | |
|---|---|---|---|---|---|
| | | | | at 20° C. no loading | at −20° C. 20 kg-cm loading |
| Specific Block Copolymer (E = 18 wt. %) | 100:0 | 9,500 | 580 | 50< | 30 |
| Conventional Block Copolymer (E = 18 wt. %) | " | 9,600 | 600 | 50< | 28 |
| Specific Block Copolymer (E = 18 wt. %) | 70:30 | 18,800 | 368 | 32 | 10 |
| Conventional Block Copolymer (E = 18 wt. %) | " | 18,900 | 195 | 20 | 6.3 |
| Specific Block Copolymer (E = 18 wt. %) | 50:50 | 28,100 | 128 | 13 | 4.7 |
| Conventional Block Copolymer (E = 18 wt. %) | " | 28,600 | 67 | 7.2 | 2.8 |
| Specific Block Copolymer (E = 18 wt. %) | 30:70 | 43,600 | 31 | 6.5 | 2.4 |
| Conventional Block Copolymer (E = 18 wt. %) | " | 43,300 | 4 | 3.0 | 1.4 |

Comparison was also made with Short, U.S. Pat. No. 3,301,921. Example 1 of the Short patent was repeated to obtain an ethylene-propylene copolymer composition containing 2.4 wt % ethylene and 15 wt % ethylene. The copolymer was admixed with unmodified calcium carbonate having average diameter of 1.7μ and the mixture was kneaded with a roller mill and was sheeted. The impact strength and elongation at break of the composition were measured.

The results are as follows:

| Resin | Ratio of resin to filler | Bending modulus of elasticity (kg/cm$^2$) | Elongation (at break) (%) | Impact Strength Dynstat (kg cm/cm$^2$) at 20° C. no loading | Impact Strength Dynstat (kg cm/cm$^2$) at −20° C. 20 kg-cm loading |
|---|---|---|---|---|---|
|  | 100:0 | 11,000 | 550 | 50< | 20 |
| Short Copolymer E = 2.4 wt % | 70:30 | 19,800 | 170 | 12 | 4.8 |
|  | 50:50 | 29,500 | 60 | 6.0 | 1.8 |
|  | 30:70 | 45,300 | 3 | 2.4 | 0.9 |
|  | 100:0 | 9,800 | 610 | 50< | 24 |
| Short Copolymer E = 15 wt % | 70:30 | 18,700 | 180 | 20 | 5.8 |
|  | 50:50 | 28,300 | 66 | 7.2 | 2.3 |
|  | 30:70 | 44,100 | 4 | 3.0 | 1.0 |

The data can be compared with Tables 1–3 above.

Having now fully described the invention, it will be apparent to one of ordinary skill in the art that many changes and modifications can be made thereto without departing from the spirit or scope of the invention as set forth herein.

Accordingly, what is claimed as new and intended to be covered by Letters Patent is:

1. In a modified propylene polymer containing a mixed polymer composition characterized by high tensile strength, high elongation and good bending stiffness, which consists essentially of:
   a. 95–60 wt. % of a crystalline propylene homopolymer,
   b. 1–20 wt. % of a crystalline block copolymer having the structure polypropylene-(ethylene-propylene) random copolymer, and
   c. 3–35 wt. % of a crystalline random ethylene-propylene copolymer, wherein the ethylene content of said modified propylene polymer is 12 wt. % to 15 wt. %, the improvement which comprises: admixing with said modified propylene polymer at least 30 wt. % of an inorganic filler having an average particle size of less than 20 microns in diameter.

2. The high inorganic filler content composition of claim 1, wherein the content of the random ethylene-propylene copolymer units is 20–5 wt % of said crystalline block copolymer.

3. The high inorganic filler content composition of claim 1, wherein the inorganic filler has a liphophilic surface.

4. The high inorganic filler content composition of claim 1, wherein the inorganic filler contains a polymer which has been reacted with a newly formed surface of said filler.

5. The high inorganic filler content composition of claim 4, wherein a vinyl polymer has been reacted with the inorganic filler.

6. The high inorganic filler content composiition of claim 1, wherein less than 70 wt % of the modified propylene polymer mixture is melted and uniformly admixed with more than 30 wt % of an inorganic filler having a particle size diameter less than 20μ and which is characterized by oleophilic surfaces.

7. The high inorganic filler content composition of claim 1, wherein less than 70 wt % of the modified propylene polymer mixture is melted and uniformly admixed with more than 50 wt % of an inorganic filler having a particle size diameter less than 20μ and which is characterized by oleophilic surfaces.

8. The modified propylene polymer of claim 1, wherein the ethylene content of said product is 12% wt.

* * * * *

UNITED STATES PATENT AND TRADEMARK OFFICE
CERTIFICATE OF CORRECTION

PATENT NO. : 4,153,587
DATED : May 8, 1979
INVENTOR(S) : Hiroshi Yui

It is certified that error appears in the above-identified patent and that said Letters Patent are hereby corrected as shown below:

Please insert the following priority data:

--[30]-- July 6, 1971 [JP] Japan ... 49692/1971 and September 3, 1971 [JP] Japan ... 68204/1971 -- rather than no priority data appearing in the Letters Patent.

Signed and Sealed this

Thirtieth Day of October 1979

[SEAL]

Attest:

RUTH C. MASON
Attesting Officer

LUTRELLE F. PARKER
Acting Commissioner of Patents and Trademarks